(12) United States Patent
Kondo et al.

(10) Patent No.: US 11,073,216 B2
(45) Date of Patent: Jul. 27, 2021

(54) FLOW CHANNEL SWITCHING VALVE AND METHOD FOR ASSEMBLING THE SAME

(71) Applicant: Fujikoki Corporation, Tokyo (JP)

(72) Inventors: Daisuke Kondo, Tokyo (JP); Kenichi Mochizuki, Tokyo (JP); Masashi Yamashita, Tokyo (JP); Seiichi Hara, Tokyo (JP); Takayuki Matsumoto, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 15 days.

(21) Appl. No.: 16/477,769

(22) PCT Filed: Jan. 17, 2017

(86) PCT No.: PCT/JP2017/040421
§ 371 (c)(1),
(2) Date: Jul. 12, 2019

(87) PCT Pub. No.: WO2018/135103
PCT Pub. Date: Jul. 26, 2018

(65) Prior Publication Data
US 2020/0141502 A1    May 7, 2020

(30) Foreign Application Priority Data
Jan. 17, 2017    (JP) .............................. JP2017-006030

(51) Int. Cl.
*F16K 11/087*    (2006.01)
*F16K 31/53*    (2006.01)

(52) U.S. Cl.
CPC .......... *F16K 11/087* (2013.01); *F16K 31/535* (2013.01)

(58) Field of Classification Search
CPC .... F16K 11/087; F16K 31/535; F16K 11/876; F16K 5/0626; F16K 5/0605; F16K 5/0636; F16K 5/0642
See application file for complete search history.

(56) References Cited

U.S. PATENT DOCUMENTS 3,014,690 A * 12/1961 Boteler ................... F16K 5/208
 251/174
4,319,734 A *  3/1982 Acar ....................... F16K 5/201
 251/174

(Continued)

FOREIGN PATENT DOCUMENTS

CN    203797046 U    8/2014
CN    203868411 U    10/2014

(Continued)

OTHER PUBLICATIONS

Chinese Office Action corresponding to Chinese Application No. 201780083704.1 dated Apr. 3, 2020.

(Continued)

*Primary Examiner* — Michael R Reid
(74) *Attorney, Agent, or Firm* — Lucas & Mercanti, LLP (57) ABSTRACT

The present invention provides a flow channel switching valve with a reduced number of components as well as a reduced weight, and a method for assembling the same. A valve shaft adapted to be coupled to a valve element so as to transmit torque of a rotary drive portion to the valve element is inserted through a vertical through-hole, which penetrates through the valve element in the direction of the rotation axis O (i.e., vertical direction), and through a fit-insertion hole provided in a valve body. Then, a drive gear that forms the rotary drive portion is fixed to the upper coupling portion of the valve shaft protruding from the (Continued)

fit-insertion hole so that the valve shaft is rotatably supported with respect to the valve body.

6 Claims, 8 Drawing Sheets

(56) References Cited

U.S. PATENT DOCUMENTS

| | | | | |
|---|---|---|---|---|
| 5,313,976 A * | 5/1994 | Beasley | ............... | F16K 5/0636 |
| | | | | 137/15.22 |
| 5,560,392 A * | 10/1996 | Spang | ................ | F16K 5/0605 |
| | | | | 137/552 |
| 5,868,378 A * | 2/1999 | McMahon | ............ | F16K 5/0647 |
| | | | | 251/315.08 |
| 8,807,530 B2 * | 8/2014 | Yang | ..................... | F16L 47/02 |
| | | | | 251/315.11 |
| 2018/0119839 A1 * | 5/2018 | Russalian | ............ | F16K 27/067 |

FOREIGN PATENT DOCUMENTS

| | | |
|---|---|---|
| JP | S51-47630 A | 4/1976 |
| JP | S59-16170 A | 1/1984 |
| JP | 2006-90408 A | 4/2006 |
| JP | 2010-223418 A | 10/2010 |
| JP | 2013029168 A | 2/2013 |
| JP | 2016-138626 A | 8/2016 |

OTHER PUBLICATIONS

English translation of Chinese Office Action corresponding to Chinese Application No. 201780083704.1 dated Apr. 3, 2020.
Korean Office Action corresponding to Korean Application No. 10-2019-7017400 dated Jun. 9, 2021 (5 pages) and English Translation (4 pages).

* cited by examiner

FLOW CHANNEL SWITCHING VALVE AND METHOD FOR ASSEMBLING THE SAME

CROSS-REFERENCE TO RELATED APPLICATIONS

This application is a 371 of PCT/JP2017/040421, filed Nov. 9, 2017, which claims benefit of Japanese Patent Application No. 2017-006030 filed on Jan. 17, 2017.

TECHNICAL FIELD

The present invention relates to a flow channel switching valve and a method for assembling the same. For example, the present invention relates to a rotary flow channel switching valve that switches a flow channel by slidably rotating a ball-shaped valve element (i.e., ball valve element) within a valve chamber.

BACKGROUND ART

As a conventional flow channel switching valve of such a type, there is known a flow channel switching valve (i.e., ball valve) that includes a valve element (i.e., ball valve element) made of an elastic material and having an inflow channel and an outflow channel, a valve chamber rotatably housing the valve element, and a valve body (i.e., valve case) having an inlet flow channel and a plurality of outlet flow channels communicating with the valve chamber, in which the inflow channel always communicates with the inlet flow channel, and the outflow channel is allowed to selectively communicate with one of the plurality of outlet flow channels through a rotating operation of the valve element (for example, see Patent Literature 1 below).

The conventional flow channel switching valve (i.e., ball valve) described in Patent Literature 1 is adapted to switch a flow channel as the valve element is rotationally driven via a valve shaft by a motor disposed above the valve body.

CITATION LIST

Patent Literature

Patent Literature 1: JP 2010-223418 A

SUMMARY OF INVENTION

Technical Problem

By the way, in the conventional flow channel switching valve such as the one described above, the valve shaft adapted to be coupled to the valve element is inserted from above through a fit-insertion hole formed in the valve body, and a flange portion formed on the outer periphery of the valve shaft is allowed to engage the upper portion of the valve body via a pressing plate that is made of metal, for example, and is fixed to the upper portion of the valve body with screws, for example, so that slippage of the valve shaft off the valve body is prevented.

Therefore, since the aforementioned conventional flow channel switching valve requires a pressing plate for preventing slippage of the valve shaft and fixation members (e.g., screws) for fixing the pressing plate to the valve body, it is concerned that the number of the components as well as the weight of the valve would unavoidably increase.

The present invention has been made in view of the foregoing, and it is an object of the present invention to provide a flow channel switching valve with a reduced number of components as well as a reduced weight, and a method for assembling the same.

Solution to Problem

Accordingly, a flow channel switching valve according to the present invention includes a valve body having a valve chamber formed therein and having a plurality of inlet/outlet ports opening to the valve chamber, a valve element rotatably arranged within the valve chamber, the valve element having a flow channel formed therein, a seat member disposed between the valve element and one of the inlet/outlet ports so as to seal a gap between the valve element and the inlet/outlet port, an elastic member disposed between the seat member and the valve body so as to press the seat member against the valve element, and a rotary drive portion adapted to rotate the valve element about a rotation axis, in which when the valve element is rotated, a communication state of the plurality of inlet/outlet ports is configured to be selectively switched via the flow channel in the valve element. The valve element has a vertical through-hole penetrating through the valve element in the direction of the rotation axis, the vertical through-hole being adapted to have engaged therewith a valve shaft that transmits torque of the rotary drive portion to the valve element such that the valve shaft is insertable into the vertical through-hole along the direction of the rotation axis in a mutually non-rotatable manner. The valve shaft is inserted through the vertical through-hole and a fit-insertion hole provided in the valve body, and a drive gear that forms the rotary drive portion is fixed to a portion of the valve shaft protruding from the fit-insertion hole so that the valve shaft is rotatably supported with respect to the valve body.

In a preferred aspect, the outer periphery of the valve shaft has a step portion, the step portion being adapted to abut and engage an inner periphery of the fit-insertion hole.

In another preferred aspect, the valve body has a split structure including a base member and a holder member, the base member having an opening at one end in the direction of the rotation axis, the opening having an outer shape larger than or equal to that of the valve element, and the holder member being securely coupled to the opening of the base member.

A method for assembling a flow channel switching valve according to the present invention is a method for assembling a flow channel switching valve, the flow channel switching valve including a valve body having a valve chamber formed therein and having a plurality of inlet/outlet ports opening to the valve chamber, a valve element rotatably arranged within the valve chamber, the valve element having a flow channel formed therein, a seat member disposed between the valve element and one of the inlet/outlet ports so as to seal a gap between the valve element and the inlet/outlet port, an elastic member disposed between the seat member and the valve body so as to press the seat member against the valve element, and a rotary drive portion adapted to rotate the valve element about a rotation axis, in which when the valve element is rotated, a communication state of the plurality of inlet/outlet ports is configured to be selectively switched via the flow channel in the valve element, the method including arranging the elastic member, the seat member, and the valve element within the valve chamber, the valve element having a vertical through-hole penetrating through the valve element in a direction of the rotation axis, the vertical through-hole being adapted to have engaged therewith a valve shaft that transmits torque of the rotary drive portion to the valve element such that the valve shaft is insertable into the vertical through-hole along the direction of the rotation axis in a mutually non-rotatable manner; and inserting the valve shaft through the vertical through-hole so as to allow the valve shaft to engage the vertical through-hole in a mutually non-rotatable manner, and inserting the valve shaft through a fit-insertion hole provided in the valve body, and then fixing a drive gear that forms the rotary drive portion to a portion of the valve shaft protruding from the fit-insertion hole so that the valve shaft is rotatably supported with respect to the valve body.

In another preferred aspect, the valve shaft is inserted through the vertical through-hole and the fit-insertion hole until a step portion provided on the outer periphery of the valve shaft abuts and engages an inner periphery of the fit-insertion hole.

Advantageous Effects of Invention

According to the present invention, the valve shaft adapted to be coupled to the valve element so as to transmit torque of the rotary drive portion to the valve element is inserted through the vertical through-hole, which penetrates through the valve element in the direction of the rotation axis (i.e., vertical direction), and through the fit-insertion hole provided in the valve body. Then, a drive gear that forms the rotary drive portion is fixed to a portion of the valve shaft protruding from the fit-insertion hole, and thus, the valve shaft is rotatably supported with respect to the valve body by the drive gear. Therefore, the number of components and the weight of the valve can be suppressed in comparison with a conventional flow channel switching valve that uses a pressing plate and fixation members, such as screws, for example.

DESCRIPTION OF EMBODIMENTS

Hereinafter, an embodiment of the present invention will be described with reference to the drawings.

In each drawing, a gap formed between some members, a clearance between some members, and the like may be depicted larger or smaller than their actual dimensions to help understand the present invention and also for the sake of convenience to create the drawing. In addition, in this specification, descriptions indicating directions or directions, such as top (upper), bottom (lower), left, right, front, and rear, are based on the directions of arrows in FIGS. 1 and 2, and do not indicate the positions or directions when the valve is actually used.

<Configuration and Operation of Flow Channel Switching Valve 1>

Figure 1:
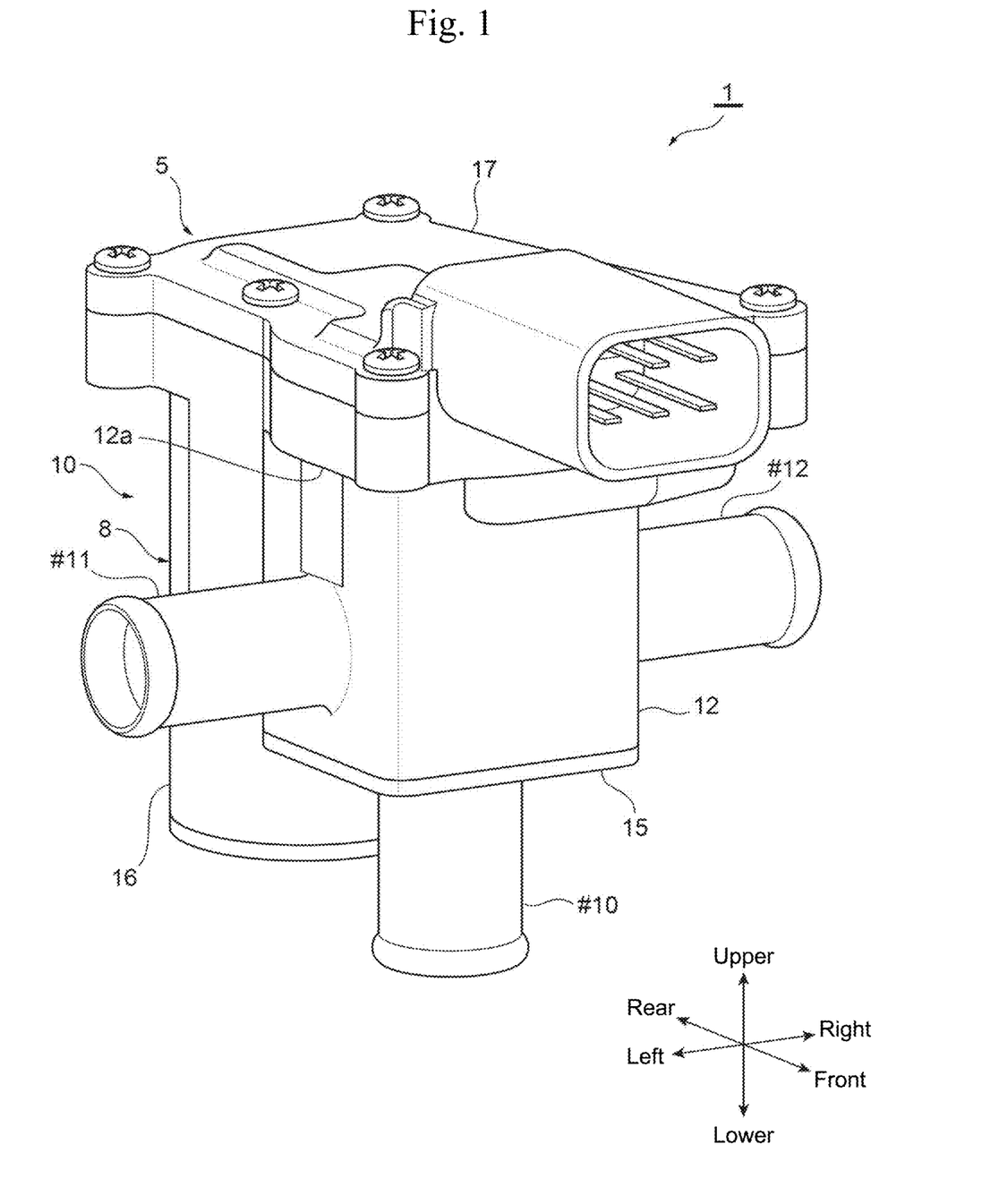
FIG. 1 is a perspective view of the overall configuration of an embodiment of a flow channel switching valve (i.e., three-way valve) in accordance with the present invention.
Figure 2:
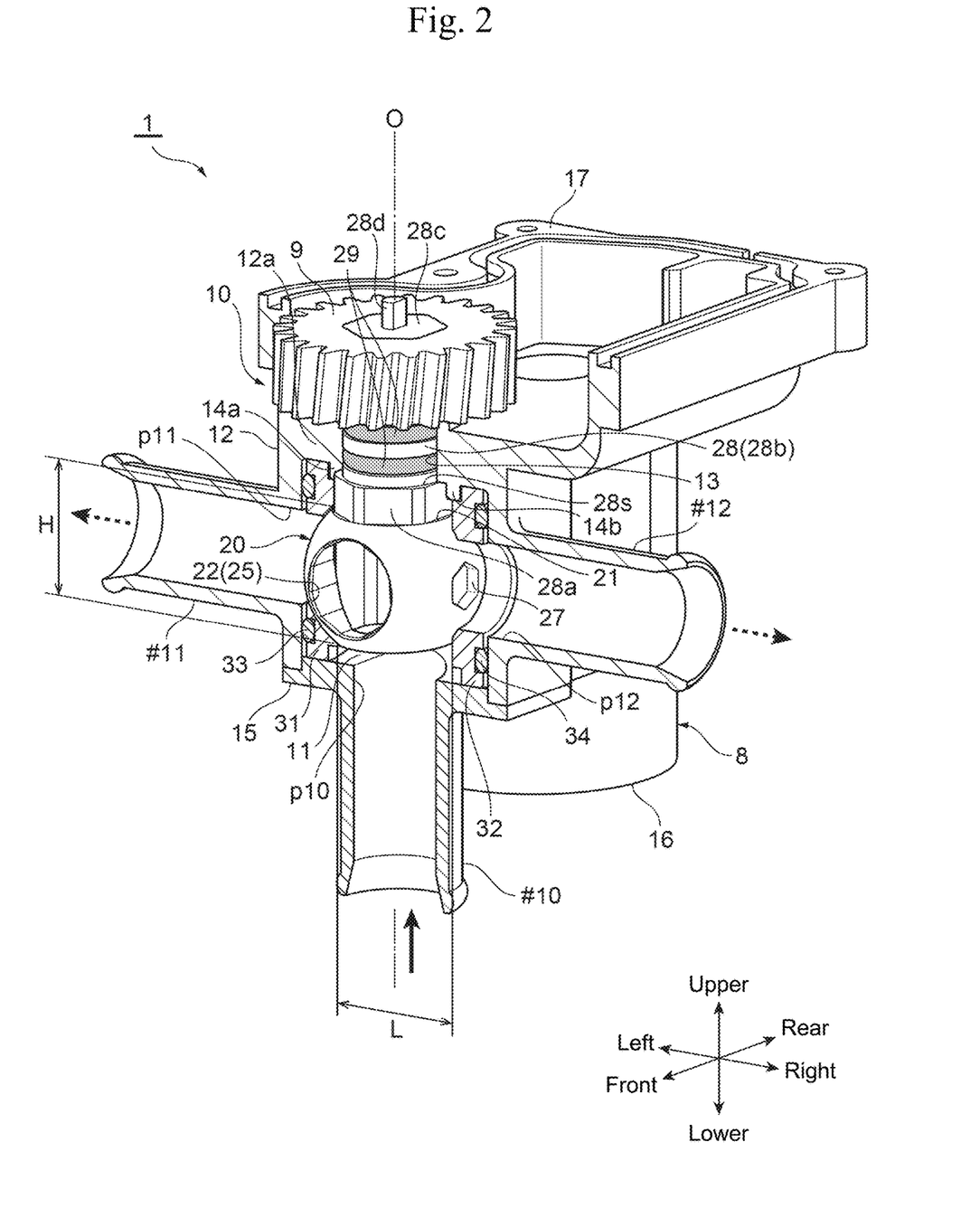
FIG. 2 is a partial longitudinal cross-sectional perspective view of the flow channel switching valve illustrated in FIG. 1.
Figure 3A:
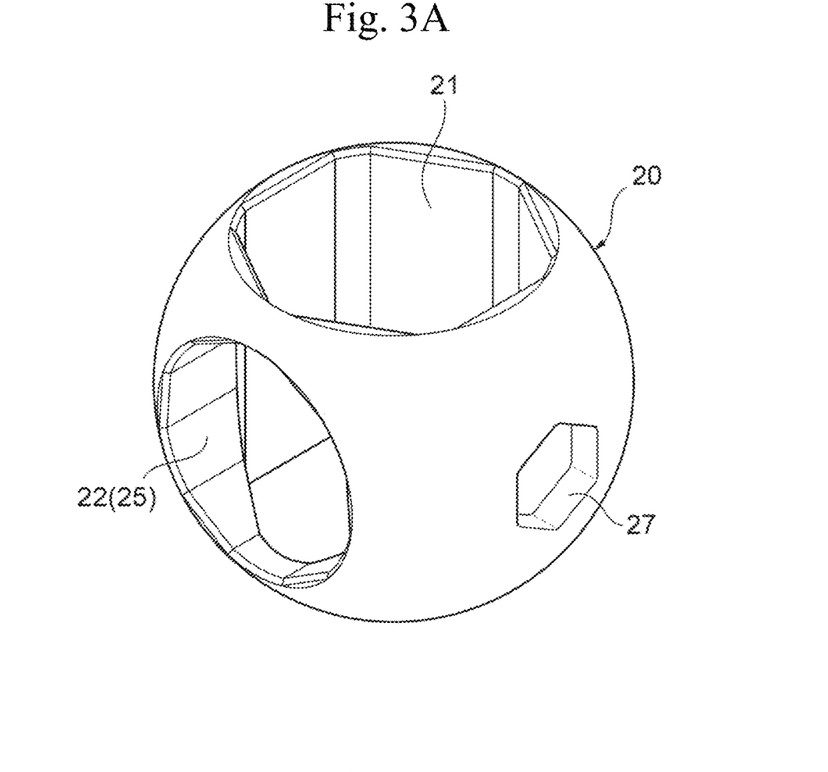
FIG. 3A is a perspective view of the valve element in FIG. 2.
Figure 3B:
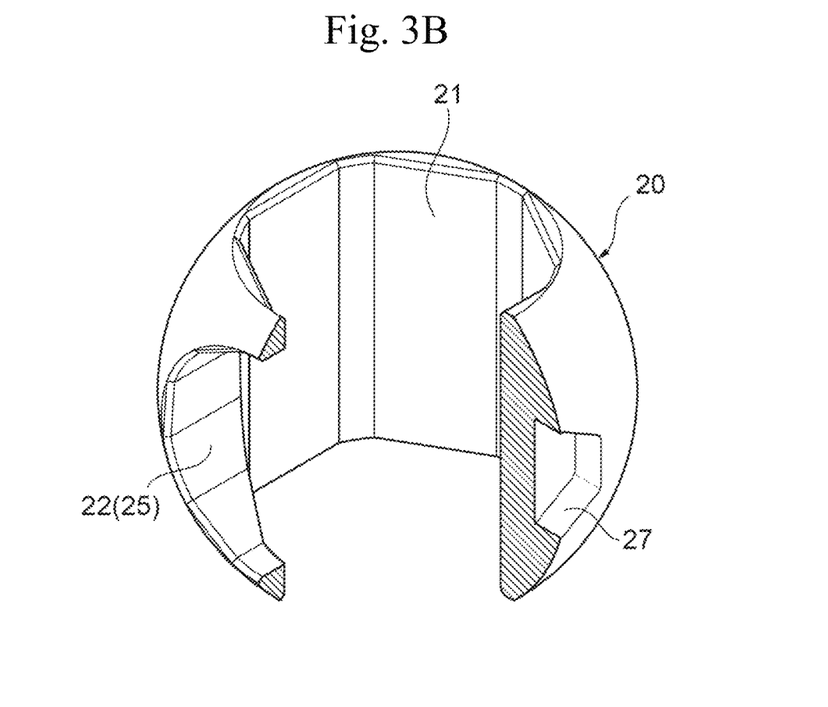
FIG. 3B is a partially cutaway perspective view of the valve element in FIG. 2 (i.e., a portion thereof at a central angle of 90° as seen in plan view is cut out).
Figure 4:
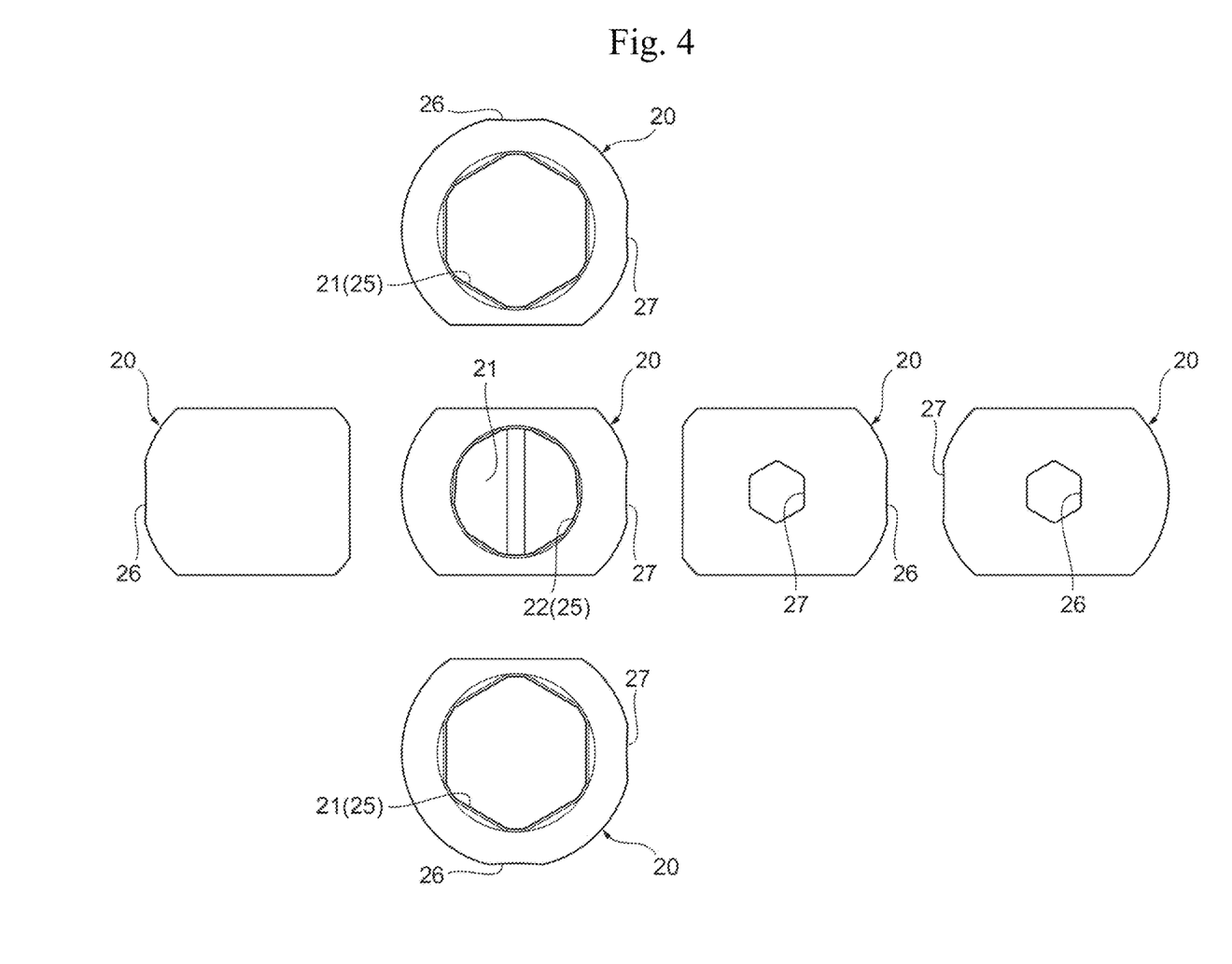
FIG. 4 is a view of six sides of the valve element in FIGS. 3A and 3B.

FIG. 1 is a perspective view of the overall configuration of an embodiment of a flow channel switching valve in accordance with the present invention. FIG. 2 is a partial longitudinal cross-sectional perspective view of the flow channel switching valve illustrated in FIG. 1. FIGS. 3A and 3B illustrate the valve element in FIG. 2. Specifically, FIG. 3A is a perspective view of the valve element, and FIG. 3B is a partially cutaway perspective view of the valve element (i.e., a portion thereof at a central angle of 90° as seen in plan view is cut out). FIG. 4 is a view of six sides of the valve element in FIGS. 3A and 3B.

The flow channel switching valve 1 of the embodiment illustrated in the drawings is used as a rotary three-way valve that switches a flow channel for a fluid flowing through the inside of an engine room of an automobile to multiple directions, for example, and basically includes a valve body 10 with a valve chamber 11, a ball-shaped valve element (also referred to as a ball valve element) 20 rotatably arranged within the valve chamber 11, a rotary drive portion 5 that includes a motor 8, a drive gear 9, and the like and is arranged in a region of from the rear portion to the upper portion of the valve body 10 so as to rotate the valve element 20 about the rotation axis (i.e., center line) 0. Herein, the valve body 10 and the rotary drive portion 5 are integrally formed. It should be noted that the rotation axis (i.e., axis extending in the vertical direction) 0 of the valve element 20 housed within the valve chamber 11 is coaxial with the center lines of an inlet port p10 and a valve shaft 28 (described below).

The valve body 10 includes a base member 12 with a rectangular tube shape, which is made of synthetic resin or metal, for example, and has a ceiling portion 12a, and a holder member 15. The base member 12 has formed therein a cylindrical valve chamber 11 lying on its side. In addition, the base member 12 is provided on its left and right sides with an outlet port (i.e., inlet/outlet port) p11 and an outlet port (i.e., inlet/outlet port) p12, respectively, that open to the valve chamber 11 and face the lateral sides. Ports #11 and #12 each made of a pipe joint are integrally coupled to the outer periphery of the base member 12 so as to communicate with the outlet ports p11 and p12, respectively. In addition, the ceiling portion 12a of the base member 12 has a fit-insertion hole 13 through which the valve shaft 28 (or an intermediate trunk portion 28b thereof) to be coupled to the valve element 20 is adapted to be inserted, and also has protrusions 14a and 14b for positioning annular seat members 31 and 32 (described below) that are disposed in a (downwardly) protruding manner about halfway around the left and right sides of the fit-insertion hole 13 (more specifically, at positions slightly closer the left and right sides around the fit-insertion hole 13 than to the portion abutted and engaged by a step portion 28s between a lower engagement portion 28a and an intermediate trunk portion 28b of the valve shaft 28 (described below)) (see also FIG. 5). The holder member 15 with a port #10, which is made of a pipe joint and provided with a vertical inlet port (i.e., inlet/outlet port) p10 opening to the valve chamber 11, is securely fitted into an opening at the lower end of the base member 12 through ultrasonic welding, screwing, press fitting, or swaging, for example (through ultrasonic welding in the example illustrated in the drawing).

That is, the valve body 10 is provided with the inlet port p10 opening to the bottom of the valve chamber 11, and the outlet ports (i.e., lateral inlet/outlet ports) p11 and p12 disposed at an angular interval of 180° therebetween (that is, at opposite sides across the rotation axis O of the valve element 20) and opening to the lateral sides of the valve chamber 11.

The rear portion of the base member 12 of the valve body 10 has integrally formed therewith a motor case portion 16, which houses the motor 8 forming the rotary drive portion 5 for rotating the valve element 20 (or the valve shaft 28 coupled thereto), while the upper portion of the base member 12 (i.e., upper face side of the ceiling portion 12a) has integrally formed therewith a gear case portion 17 that houses the drive gear 9 coupled to the motor 8 and the like for transmitting torque of the motor 8 to the valve shaft 28.

The valve element 20 is produced from synthetic resin or metal, for example, and includes a flow channel (i.e., internal flow channel) 25 therein to allow the inlet port p10 and one of the two outlet ports p11 and p12 provided in the valve body 10 to selectively communicate with each other, that is, selectively switch the communication state between the inlet port p10 and one of the two outlet ports p11 and p12.

The internal flow channel 25 includes a through-hole penetrating through the valve element 20 from its bottom to the lateral side. The bottom opening of the through-hole always communicates with the inlet port p10, and the lateral opening of the through-hole is allowed to selectively communicate with one of the two outlet ports p11 and p12.

Specifically, as clearly seen in FIGS. 3A, 3B, and 4, the valve element 20 has formed therein a vertical through-hole 21 with an approximately hexagonal cross-section that penetrates through the valve element 20 in the vertical direction (i.e., direction of the rotation axis O of the valve element 20; openings at the upper and lower ends of the vertical through-hole 21 are approximately hexagonal in shape), and also has formed therein a horizontal hole 22 with an approximately hexagonal cross-section that merges with the center of the vertical through-hole 21 from the outer periphery (i.e., lateral side) of the valve element 20 (i.e., in the direction orthogonal to the rotation axis O of the valve element 20).

The vertical through-hole 21 (or the bottom opening thereof) always communicates with the inlet port p10, while the horizontal hole 22 (or the lateral opening thereof) is allowed to selectively communicate with one of the two outlet ports p11 and p12. The lower half of the vertical through-hole 21 and the horizontal hole 22 form the internal flow channel 25 with an inverted L shape as seen in side view (in the valve element 20).

In addition, the outer periphery (i.e., outer peripheral seal face) of the valve element 20, specifically, the rear side of the lateral opening of the horizontal hole 22 and the lateral side of the lateral opening of the horizontal hole 22 on the outer periphery of the valve element 20 are provided with hexagon sockets (recess holes each having a hexagonal shape as seen in side view) 26 and 27, respectively, as rotation engagement portions for arranging the valve element 20 within the valve chamber 11 by rotating it during assembly (which will be described in detail later).

The valve element 20 (or the upper portion of the vertical through-hole 21 thereof) has coupled thereto the valve shaft 28 (or the lower portion of the lower engagement portion 28a thereof) with a stepped portion for transmitting torque of the motor 8 to the valve element 20.

Figure 6:
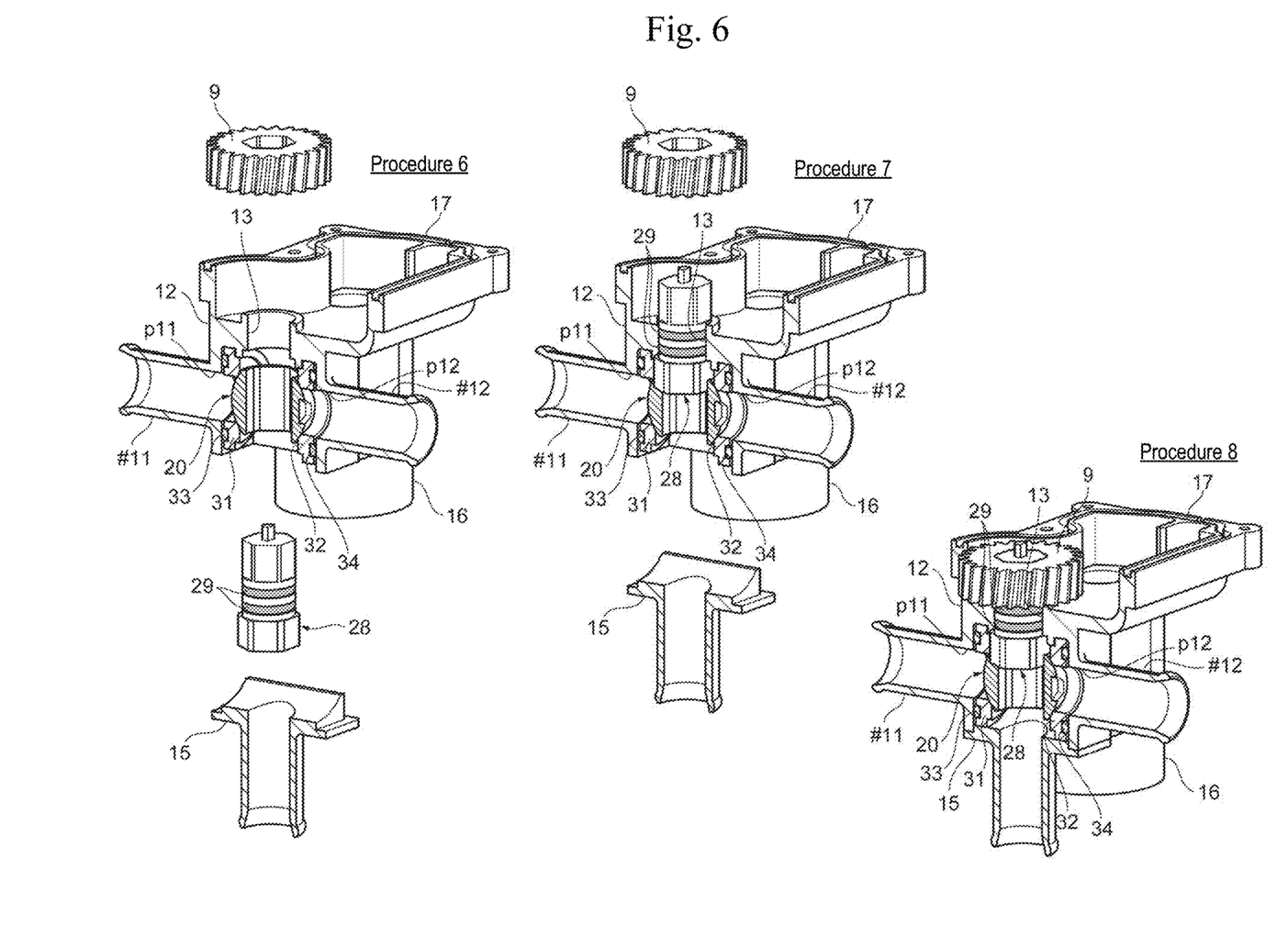
FIG. 6 illustrates procedures for assembling the flow channel switching valve illustrated in FIG. 1 (i.e., procedures for fixing the valve shaft to the valve body such that the valve shaft is supported on the valve body).

Specifically, as clearly seen in FIG. 6 in conjunction with FIG. 2, the valve shaft 28 includes, sequentially arranged from its bottom, the lower engagement portion 28a having a shape complementary (i.e., approximately hexagonal cross-section) to that of the vertical through-hole 21 of the valve element 20 or a slightly smaller shape than that of the vertical through-hole 21, the intermediate trunk portion 28b having a circular cross-section and a slightly smaller shape than that of the lower engagement portion 28a, an upper coupling portion 28c having an approximately hexagonal cross-section and substantially the same outside diameter as that of the intermediate trunk portion 28b, and a D-cut projection 28d to be used for circumferential positioning that is provided in a protruding manner on the upper coupling portion 28c. The lower engagement portion 28a (or the lower portion thereof) is fitted and inserted into the top opening of the vertical through-hole 21, and the intermediate trunk portion 28b is inserted through (the inside of) the fit-insertion hole 13 of the valve body 10 so that the upper coupling portion 28c protrudes upward (i.e., toward the upper face side of the ceiling portion 12a) from the fit-insertion hole 13. O-rings 29 as seal members are disposed in two stages around the intermediate trunk portion 28b (or in annular grooves formed on the outer periphery thereof) rotatably inserted through the fit-insertion hole 13.

As the lower engagement portion 28a is fitted and inserted through the vertical through-hole 21, the valve element 20 is caused to engage the valve shaft 28 in a mutually non-rotatable manner about the rotation axis O, and thus, the valve shaft 28 and the valve element 20 rotate integrally.

In addition, the step portion 28s formed between the lower engagement portion 28a and the intermediate trunk portion 28b of the valve shaft 28 is caused to abut and engage the inner periphery of the fit-insertion hole 13 of the ceiling portion 12a of the valve body 10 (or the base member 12 thereof). Meanwhile, the drive gear 9 of the rotary drive portion 5 is externally fitted around and fixed to the upper coupling portion 28c of the valve shaft 28 protruding from the fit-insertion hole 13 through press fitting or swaging, for example. Thus, the valve shaft 28 is rotatably supported with respect to the valve body 10 (without moving in the vertical direction) such that the ceiling portion 12a of the valve body 10 is sandwiched between the step portion 28s (or the upper face thereof) and the drive gear 9 (or the lower face thereof).

As described above, since the outer shape of the vertical through-hole 21 of the valve element 20 is set larger than that of the valve shaft 28, the valve shaft 28 can be inserted through the vertical through-hole 21 in the vertical direction (i.e., direction of the rotation axis O) (which will be described in detail later).

In addition, the annular seat members 31 and 32 made of Teflon (registered trademark), for example, and having openings corresponding to the outlet ports p11 and p12, respectively, are arranged around the outlet ports p11 and p12 on the inner wall faces of the valve body 10 (i.e., left and right end faces of the valve chamber 11). That is, the pair of seat members 31 and 32 are arranged on opposite sides across the rotation axis O of the valve element 20, corresponding to the pair of left and right outlet ports p11 and p12, respectively, within the valve chamber 11 of the valve body 10, and the valve element 20 is rotatably and slidably arranged between (i.e., on the inner side of) the pair of seat members 31 and 32. A portion of each of the seat members 31 and 32 around the opening on the inner periphery (i.e., face) is formed as a curved face (i.e., a part of a recessed spherical face), and serves as an inner peripheral seal face that is positioned opposite the outer peripheral seal face (i.e., curved face) of the valve element 20 when a flow channel is formed. Meanwhile, in this example, the height H in the vertical direction (i.e., direction of the rotation axis O) of the valve element 20 arranged between the pair of seat members 31 and 32 is set less than or equal to the distance L between the seat members 31 and 32 or slightly less than that (which will be described in detail later).

O-rings (i.e., elastic members) 33 and 34, which are seal members made of elastic materials, such as rubber, are disposed (in a compressed state) between the seat members 31 and 32 and the valve body 10 (or around the outlet ports p11 and p12, respectively; specifically, in annular grooves formed on the left face of the seat member 31 (i.e., face on the side of the outlet port p11) and on the right face of the seat member 32 (i.e., face on the side of the outlet port p12)). Due to the elastic force (i.e., repulsive force) of the O-rings 33 and 34, the seat members 31 and 32 (or the inner peripheral seal faces thereof) are tightly pressed against the valve element 20 (or the outer peripheral seal face thereof). Accordingly, the gap between the valve element 20 and each of the outlet ports p11 and p12 is sealed hermetically.

In the flow channel switching valve (i.e., three-way valve) 1 with such a configuration, when the valve element 20 is rotated within the valve chamber 11 by the rotary drive portion 5 including the motor 8, the drive gear 9, and the like, the communication state between the inlet port p10 and one of the two outlet ports p11 and p12 provided in the valve body 10 is selectively switched via the internal flow channel 25 provided in the valve element 20.

Specifically, as the valve element 20 is rotated by about 180°, the mode is selectively switched between a mode (i.e., first communication state) in which the inlet port p10 provided at the bottom of the valve body 10 and the outlet port p11 provided on the left side communicate with each other (via the internal flow channel 25 including the lower half of the vertical through-hole 21 and the horizontal hole 22) and a mode (i.e., second communication state) in which the inlet port p10 provided at the bottom of the valve body 10 and the outlet port p12 provided on the right side communicate with each other (via the internal flow channel 25 including the lower half of the vertical through-hole 21 and the horizontal hole 22).

In the first communication state, the opening of the seat member 32 corresponding to the outlet port p12 on the right side is blocked by the valve element 20 (or the outer peripheral seal face thereof; herein, a portion where the hexagon socket 26 is formed), and the flow channel connecting to the outlet port p12 is blocked so that a fluid that has flowed upward via the inlet port p10 passes through the internal flow channel 25 of the valve element 20 and flows out of only the outlet port p11 on the left side. Meanwhile, in the second communication state, the opening of the seat member 31 corresponding to the outlet port p11 on the left side is blocked by the valve element 20 (or the outer peripheral seal face thereof; herein, a portion where the hexagon socket 26 is formed), and the flow channel connecting to the outlet port p11 is blocked so that a fluid that has flowed upward via the inlet port p10 passes through the internal flow channel 25 of the valve element 20, and flows out of only the outlet port p12 on the right side.

<Method for Assembling Flow Channel Switching Valve 1>

Figure 5:
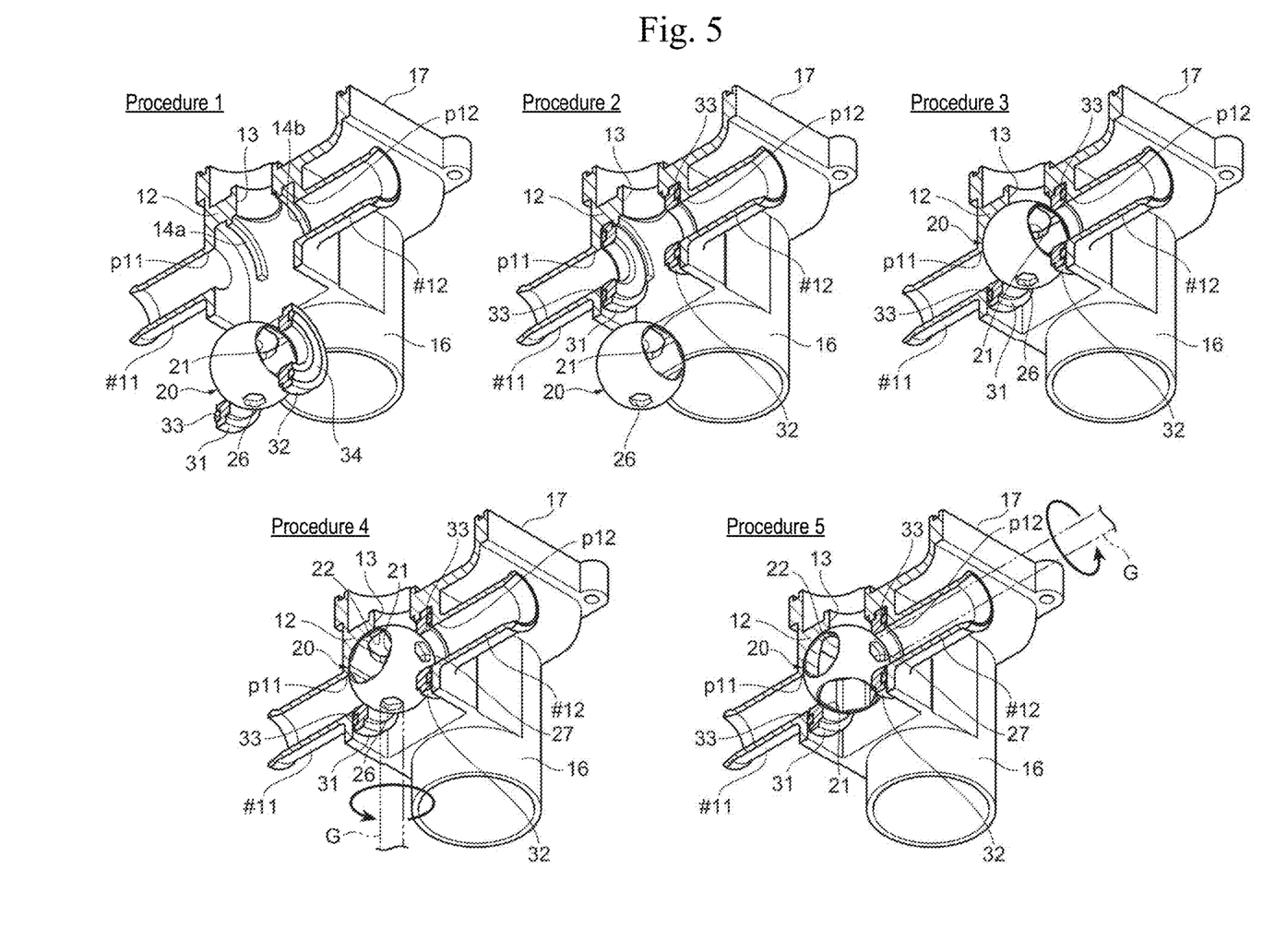
FIG. 5 illustrates procedures for assembling the flow channel switching valve illustrated in FIG. 1 (i.e., procedures for disposing the valve element within the valve chamber).

The flow channel switching valve (i.e., three-way valve) 1 with the aforementioned configuration is assembled through the following procedures, for example. FIGS. 5 and 6 each illustrate procedures for assembling the flow channel switching valve illustrated in FIG. 1. Specifically, FIG. 5 illustrates procedures for disposing the valve element within the valve chamber, and FIG. 6 illustrates procedures for fixing the valve shaft to the valve body such that the valve shaft is supported on the valve body.

In assembling the flow channel switching valve 1, as illustrated in FIG. 5, the O-rings 33 and 34 are first arranged on the seat members 31 and 32 (or in the annular recess grooves thereof), respectively (Procedure 1), and before the holder member 15 is attached to the base member 12 (or the opening at the lower end thereof) forming the valve body 10, the seat members 31 and 32 with the O-rings 33 and 34, respectively, are arranged inside the base member 12 via the opening at the lower end thereof (that is, within the valve chamber 11; around the left and right outlet ports p11 and p12 thereof, respectively) (Procedure 2). At this time, the seat members 31 and 32 are positioned within the valve chamber 11 using the protrusions 14a and 14b provided on the ceiling portion 12a of the base member 12, respectively, and the distance between the seat members 31 and 32 is set greater than or equal to the height of the valve element 20 in the vertical direction (i.e., direction of the rotation axis O) or slightly greater than that.

Next, the valve element 20, which has formed therein the internal flow channel 25 including the vertical through-hole 21 and the horizontal hole 22, is arranged within the base member 12 (specifically, between the seat members 31 and 32 arranged around the outlet ports p11 and p12, respectively, within the valve chamber 11) via the bottom opening of the base member 12 (i.e., opening with an outer shape (or outside diameter) greater than or equal to that of the valve element 20) in a posture in which the valve element 20 is laid on its side (i.e., a posture in which the direction of the rotation axis of the valve element 20 is made horizontal or the rotation axis of the valve element 20 faces the lateral sides, and the upper and lower end faces of the valve element 20 face the left and right seat members 31 and 32) and the hexagon socket 26 faces downward (Procedure 3).

In such a state, a rotating jig G, such as a hexagonal wrench, having a head with a hexagonal cross-section at its tip end is inserted through the bottom opening of the base member 12, for example, and the head is fitted into (or is caused to engage) the hexagon socket (i.e., rotation engagement portion) 26 of the valve element 20 so as to rotate the rotating jig G. Accordingly, the valve element 20 is rotated by about 90° between the seat members 31 and 32 within the valve chamber 11 (i.e., rotated counterclockwise by about 90° about the axis extending in the vertical direction as seen from the lower side) (Procedure 4). When the valve element 20 rotates, the outer periphery (i.e., outer peripheral seal face) of the valve element 20 slides on the left and right seat members 31 and 32 (or the inner peripheral seal faces thereof), and the O-rings 33 and 34 arranged on the outer sides of the seat member 31 and 32, respectively, are slightly compressed so that the outer periphery (i.e., outer peripheral seal face) of the valve element 20 is in pressure-contact with the seat members 31 and 32 (or the inner peripheral seal faces thereof).

Next, a rotating jig G, which is similar to the aforementioned one, is inserted through the port #12 on the right side of the base member 12, and its head is fitted into (or is caused to engage) the hexagon socket (i.e., rotation engagement portion) 27 of the valve element 20 so as to rotate the rotating jig G. Accordingly, the valve element 20 is rotated by about 90° between the seat members 31 and 32 within the valve chamber 11 (i.e., rotated counterclockwise by about 90° about the axis extending in the horizontal direction as seen from the right side) (Procedure 5).

As described above, the valve element 20 is rotated about two axes that are orthogonal to the rotation axis O between the seat members 31 and 32 within the valve chamber 11 so that the valve element 20 is arranged within the valve chamber 11 in a posture in which the valve element 20 is used (i.e., posture in which the direction of the rotation axis O of the valve element 20 lies along the vertical direction and the vertical through-hole 21 faces the upper and lower sides).

Next, as illustrated in FIG. 6, the O-rings 29 are arranged around the intermediate trunk portion 28b of the valve shaft 28 (Procedure 6). Then, in a state in which the rotation position (i.e., angular position around the rotation axis O) between the lower engagement portion 28a of the valve shaft 28 and the vertical through-hole 21 of the valve element 20 is positioned, the valve shaft 28 is inserted into the vertical through-hole 21 of the valve element 20 via the bottom opening of the base member 12 until the step portion 28s between the lower engagement portion 28a and the intermediate trunk portion 28b of the valve shaft 28 abuts the ceiling portion 12a of the base member 12 of the valve body 10 (or the inner periphery of the fit-insertion hole 13 thereof). Accordingly, the lower engagement portion 28a (or the lower portion thereof) of the valve shaft 28 is fitted and inserted into the top opening of the vertical through-hole 21 (in a state in which the lower engagement portion 28a is caused to engage the top opening of the vertical through-hole 21 in a mutually non-rotatable manner about the rotation axis O), and the intermediate trunk portion 28b is inserted through the fit-insertion hole 13 of the valve body 10 so that the upper coupling portion 28c protrudes upward from the fit-insertion hole 13 (Procedure 7).

Then, the holder member 15 is attached to the bottom opening of the base member 12 through ultrasonic welding or screwing, for example, and the drive gear 9 of the rotary drive portion 5 is attached to the upper coupling portion 28c of the valve shaft 28 protruding from the fit-insertion hole 13 through press fitting or swaging, for example, so that the valve shaft 28 is fixed to the valve body 10 such that the valve shaft 28 is rotatably supported on the valve body 10 while slippage of the valve shaft 28 is prevented (Procedure 8). Further, the motor 8 and the like forming the rotary drive portion 5 are attached to the valve body 10 so as to assemble the flow channel switching valve 1.

In the aforementioned flow channel switching valve 1, the distance between the seat members 31 and 32 arranged within the valve chamber 11 is set greater than or equal to the height of the valve element 20 in the vertical direction (i.e., direction of the rotation axis O) or slightly greater than that so as to allow the valve element 20 to be smoothly inserted into the valve chamber 11. However, even when the distance between the seat members 31 and 32 is slightly smaller than the height of the valve element 20 in the vertical direction, the left and right O-rings 33 and 34 may be compressed via the seat members 31 and 32, respectively, when the valve element 20 is inserted (i.e., compressed with a compressive force that is greater than the compressive force acting on the O-rings 33 and 34 during the normal use) so that the distance between the seat members 31 and 32 may be increased through push-out and the valve element 20 may thus be arranged between the seat members 31 and 32.

As described above, in the flow channel switching valve 1 of the present embodiment, the valve shaft 28, which is adapted to be coupled to the valve element 20 so as to transmit torque of the rotary drive portion 5 to the valve element 20, is inserted through the vertical through-hole 21 penetrating through the valve element 20 in the direction of the rotation axis O (i.e., vertical direction), and through the fit-insertion hole 13 provided in the valve body 10, and the drive gear 9 forming the rotary drive portion 5 is fixed to the upper coupling portion 28c of the valve shaft 28 protruding from the fit-insertion hole 13 so that the valve shaft 28 is rotatably supported with respect to the valve body 10 by the drive gear 9. Therefore, the number of components and the weight of the valve can be suppressed in comparison with a conventional flow channel switching valve that uses a pressing plate and fixation members, such as screws, for example.

Needless to say, the configuration, shape, and the like of the internal flow channel 25 formed inside the valve element 20 can be changed as appropriate in accordance with the intended use of the flow channel switching valve 1, for example.

Figure 7A:
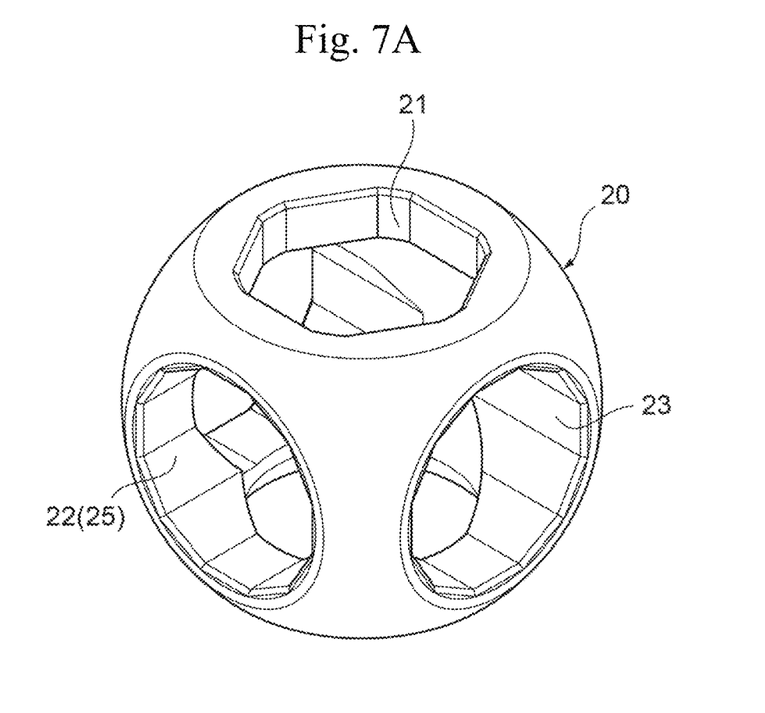
FIG. 7A is a perspective view of another exemplary valve element of the flow channel switching valve illustrated in FIG. 1.
Figure 7B:
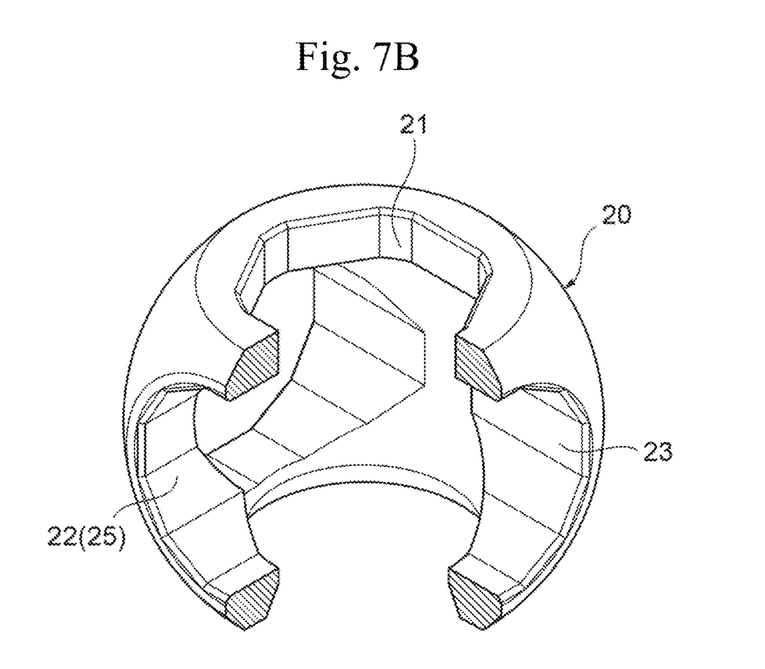
FIG. 7B is a partially cutaway perspective view of another exemplary valve element of the flow channel switching valve illustrated in FIG. 1 (i.e., a portion thereof at a central angle of 90° as seen in plan view is cut out).
Figure 8:
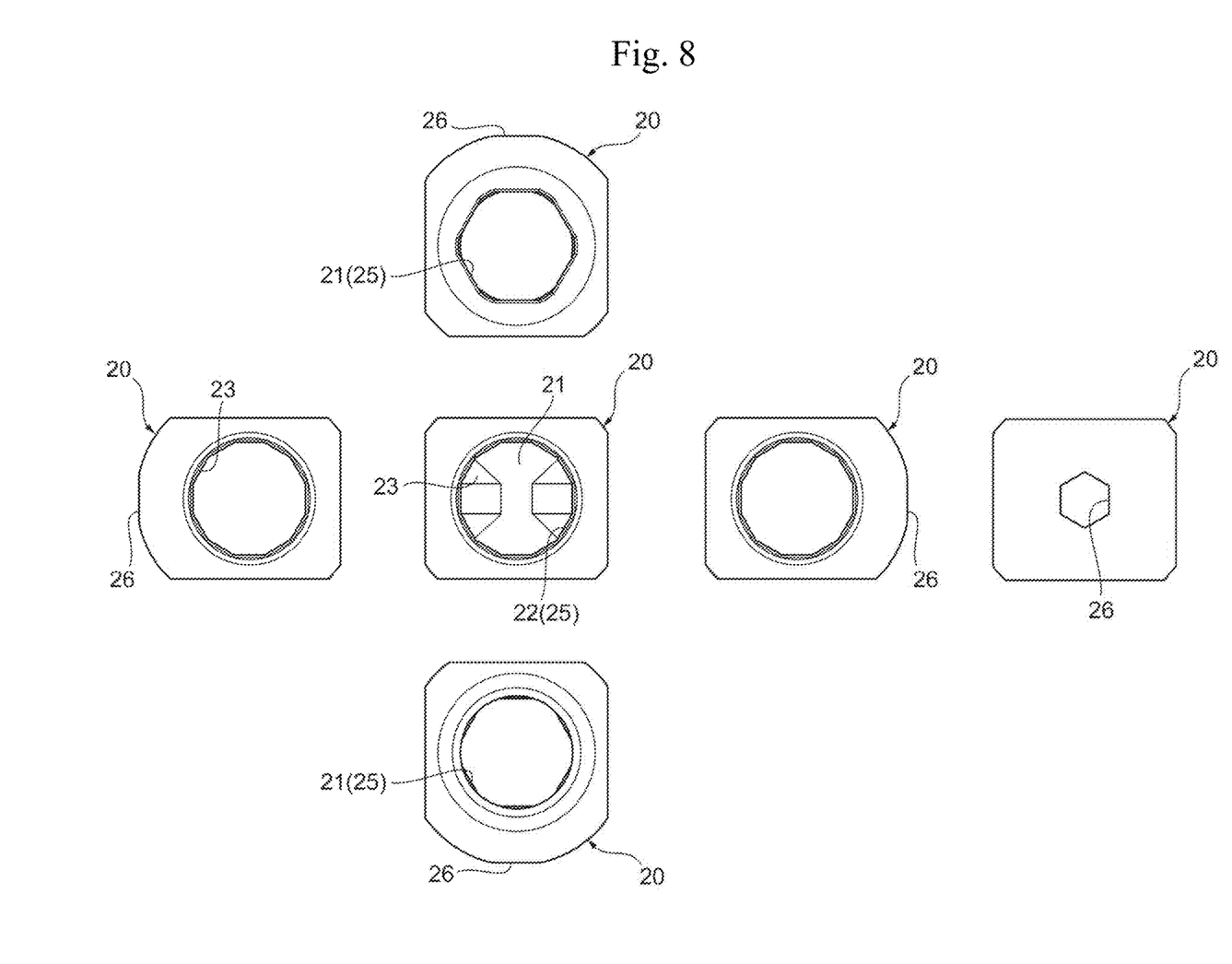
FIG. 8 is a view of six sides of the valve element in FIGS. 7A and 7B.

For example, as illustrated in FIGS. 7A, 7B, and 8, in addition to the aforementioned vertical through-hole 21 and the horizontal hole 22, a horizontal through-hole 23 with an approximately hexagonal cross-section (i.e., having hexagonal lateral openings), which penetrates through the valve element 20 perpendicularly to the rotation axis O and crosses and merges with the vertical through-passage 21 and the horizontal hole 22, may be formed. In such a case, the aforementioned hexagon socket (i.e., rotation engagement portion) 27 is omitted, but the horizontal through-hole 23 (or an opening at an end thereof) may be used as a rotation engagement portion like the aforementioned hexagon socket 27. It should be noted that in the example illustrated in FIGS. 7A, 7B, and 8, the bottom opening of the vertical through-hole 21 is in the shape of a circle that is slightly larger than the top opening of the hexagon as seen in plan view. When the valve element 20 illustrated in FIGS. 7A, 7B, and 8 is used, as the valve element 20 is rotated by about 180°, the mode is selectively switched among three modes including a mode (i.e., first communication state) in which the inlet port p10 provided at the bottom of the valve body 10 and only the outlet port p11 provided on the left side of the valve body 10 communicate with each other (via the internal flow channel 25 including the lower half of the vertical through-hole 21 and the horizontal hole 22), a mode (i.e., second communication state) in which the inlet port p10 provided at the bottom of the valve body 10 and both the outlet ports p11 and p12 provided on the left and right sides of the valve body 10 communicate with the each other (via the internal flow channel 25 including the lower half of the vertical through-hole 21 and the horizontal through-hole 23), and a mode (i.e., third communication state) in which the inlet port p10 provided at the bottom of the valve body 10 and only the outlet port p12 provided on the right side of the valve body 10 communicate with each other (via the internal flow channel 25 including the lower half of the vertical through-hole 21 and the horizontal hole 22).

It is not necessarily required to provide both the horizontal hole 22 and the horizontal through-hole 23. For example, the horizontal through-hole 23 such as the one illustrated in FIGS. 7A, 7B, and 8 may be provided instead of the horizontal hole 22 without the need for specific illustration.

Needless to say, an appropriate shape may be selected for the cross-sectional shape of each of the vertical through-hole 21, the horizontal hole 22, the horizontal through-hole 23, and the hexagon sockets 26 and 27, which serves as the rotation engagement portions, formed in the valve element 20. For example, the cross-sectional shape of each of the vertical through-hole 21 and the horizontal through-hole 23 may be a polygonal shape other than a hexagon or an elliptical shape, for example, while the lateral opening of the horizontal hole 22 may be a polygonal shape other than a hexagon, an elliptical shape, or a circular shape, for example. Further, each of the hexagon sockets 26 and 27 may be a hole with a polygonal shape other than a hexagon or an elliptical shape, for example, as long as the valve element 20 can be rotated within the valve chamber 11 during assembly.

Further, needless to say, the number, arrangement, and configuration of the inlet/outlet ports (i.e., inlet ports and outlet ports) formed in the valve body 10 may be changed as appropriate in accordance with a portion to which the flow channel switching valve 1 is applied. Although the aforementioned embodiment illustrates an example of a three-way valve in which the inlet port p10 opens to the bottom of the valve chamber 11, and the two outlet ports p11 and p12 are disposed at an angular interval of 180° therebetween and open to the lateral sides of the valve chamber 11, as the flow channel switching valve 1, it is also possible to use, for example, a two-way valve in which the inlet port on the bottom side is omitted and one of the outlet ports on the lateral sides is used as the inlet port instead, or a four or more-way valve in which the number, arrangement, and configuration, for example, of the inlet ports and the outlet ports that open to the valve chamber are changed.

Although the flow channel switching valve 1 of the aforementioned embodiment is used to switch a flow channel in an engine room (e.g., engine cooling circuit or electronic device cooling circuit) of a vehicle, it is needless to say that the flow channel switching valve 1 may also be used to switch a flow channel in a hot-water supply apparatus, for example.

REFERENCE SIGNS LIST

1 Flow channel switching valve
5 Rotary drive portion
8 Motor
9 Drive gear
10 Valve body
11 Valve chamber
12 Base member
12*a* Ceiling portion
13 Fit-insertion hole
15 Holder member
20 Valve element
21 Vertical through-hole
22 Horizontal hole
23 Horizontal through-hole
24 Internal flow channel
26, 27 Hexagon socket (rotation engagement portion)
28 Valve shaft
28*a* Lower engagement portion
28*b* Intermediate trunk portion
28*c* Upper coupling portion
28*d* D-cut projection
28*s* Step portion
29 O-ring
31, 32 Seat member
33, 34 O-ring (elastic member)
p10 Inlet port (inlet/outlet port)
p11 Outlet port (lateral inlet/outlet port)
p12 Outlet port (lateral inlet/outlet port)

The invention claimed is:

1. A flow channel switching valve comprising:
a valve body having a valve chamber formed therein and having a plurality of inlet/outlet ports opening to the valve chamber;
a valve element rotatably arranged within the valve chamber, the valve element having a top, a bottom and a flow channel formed between the top and bottom of the valve element;
a seat member disposed between the valve element and one of the inlet/outlet ports configured to seal a gap between the valve element and the inlet/outlet port;
an elastic member disposed between the seat member and the valve body configured to press the seat member against the valve element; and
a rotary drive portion configured to rotate the valve element about a rotation axis,
wherein:
the valve element being configured to rotate and selectively switch a communication state of the plurality of inlet/outlet ports to the flow channel in the valve element,
the valve element has a vertical through-hole extending from the top to the bottom of the valve element and penetrating through the valve element in a direction of the rotation axis, the vertical through-hole being configured to engage a valve shaft that transmits torque of the rotary drive portion to the valve element,
the valve shaft being configured to be insertable through the bottom of the valve element into the vertical through-hole along the direction of the rotation axis in a mutually non-rotatable manner,
the valve shaft being inserted through the vertical through-hole at the top of the valve element and a fit-insertion hole provided in the valve body, the vertical through-hole and the fit-insertion hole being proximal to each other, and a drive gear that forms the rotary drive portion is fixed to a portion of the valve shaft protruding from the fit-insertion hole so that the valve shaft is rotatably supported with respect to the valve body, and
the valve shaft includes a lower engagement portion, an upper coupling portion, and an intermediate trunk portion,
the lower engagement portion having a shape complementary to an inner periphery of the vertical through-hole at the top of the valve element, the lower engagement portion being disposed within the inner periphery of the vertical through-hole to engage and rotate the valve element during rotation of the valve shaft,
the upper coupling portion having a diameter smaller than that of the lower engagement portion and being configured to have the drive gear fixed thereto, and the intermediate trunk portion having a diameter smaller than that of the lower engagement portion and being configured to couple the lower engagement portion and the upper coupling portion together.

2. The flow channel switching valve according to claim 1, wherein an outer periphery of the valve shaft has a step portion, the step portion being adapted to abut and engage an inner periphery of the fit-insertion hole.

3. The flow channel switching valve according to claim 1, wherein the valve body has a split structure including a base member and a holder member, the base member having an opening at one end in the direction of the rotation axis, the opening having an outer shape larger than or equal to that of the valve element, and the holder member being securely coupled to the opening of the base member.

4. The flow channel switching valve according to claim 1, further comprising rotation engagement portions in at least two positions of an outer periphery of the valve element, each rotation engagement portion being adapted to be used to arrange the valve element within the valve chamber by rotating the valve element in a predetermined direction within the valve chamber.

5. A method for assembling a flow channel switching valve, the method comprising:

providing the flow channel switching valve including a valve body having a valve chamber formed therein and having a plurality of inlet/outlet ports opening to the valve chamber, a valve element rotatably arranged within the valve chamber, the valve element having top, a bottom and a flow channel formed between the top and bottom of the valve element, a seat member disposed between the valve element and one of the inlet/outlet ports configured to seal a gap between the valve element and the inlet/outlet port, an elastic member disposed between the seat member and the valve body configured to press the seat member against the valve element, and a rotary drive portion configured to rotate the valve element about a rotation axis, in which the valve element being configured to rotate and selectively switch a communication state of the plurality of inlet/outlet ports the flow channel in the valve element, arranging the elastic member, the seat member, and the valve element within the valve chamber, the valve element having a vertical through-hole extending from the top to the bottom of the valve element and penetrating through the valve element in a direction of the rotation axis, the vertical through-hole being configured to engage a valve shaft configured to transmit torque of the rotary drive portion to the valve element, the valve shaft being configured to be insertable through the bottom of the valve element into the vertical through-hole along the direction of the rotation axis in a mutually non-rotatable manner; and inserting the valve shaft through the vertical through-hole at the top of the valve element thereby allowing the valve shaft to engage the vertical through-hole in a mutually non-rotatable manner, and inserting the valve shaft through a fit-insertion hole provided in the valve body, from a side opposite to the rotary drive portion in the direction of the rotation axis, the top vertical through-hole and the fit-insertion hole being proximal to each other, and then fixing a drive gear that forms the rotary drive portion to a portion of the valve shaft protruding from the fit-insertion hole so that the valve shaft is rotatably supported with respect to the valve body.

6. The method for assembling the flow channel switching valve according to claim 5, wherein the valve shaft is inserted through the vertical through-hole and the fit-insertion hole until a step portion provided on an outer periphery of the valve shaft abuts and engages an inner periphery of the fit-insertion hole.

* * * * *